US008677314B1

(12) United States Patent
Silverstein et al.

(10) Patent No.: US 8,677,314 B1
(45) Date of Patent: Mar. 18, 2014

(54) MODIFYING A SOURCE CODE FILE TO REDUCE DEPENDENCIES INCLUDED THEREIN

(75) Inventors: Craig Silverstein, Mountain View, CA (US); Zhanyong Wan, Redmond, WA (US)

(73) Assignee: Google Inc., Mountain View, CA (US)

( * ) Notice: Subject to any disclaimer, the term of this patent is extended or adjusted under 35 U.S.C. 154(b) by 78 days.

(21) Appl. No.: 13/213,036

(22) Filed: Aug. 18, 2011

(51) Int. Cl.
*G06F 9/44* (2006.01)

(52) U.S. Cl.
USPC ............ 717/110; 717/111; 717/112; 717/143

(58) Field of Classification Search
USPC .................................. 717/110, 111, 112, 143
See application file for complete search history.

(56) References Cited

U.S. PATENT DOCUMENTS

| 6,182,281 | B1 * | 1/2001 | Nackman et al. | 717/116 |
| 2004/0117780 | A1 * | 6/2004 | Sea et al. | 717/159 |
| 2007/0094650 | A1 | 4/2007 | Klein et al. | |

OTHER PUBLICATIONS

Vo et al., "Incl: A tool to analyze include files", Jun. 1992, AT&T Bell Labs, USENIX Association, 16 pages.*
"Instructions for Developers—Introduction to Include What You Use for developers and bug-fixers", Include-What-You-Use, retrieved from <http://code.google.com/p/include-what-you-use/wiki/InstructionsForDevelopers>, updated Feb. 4, 2011.
Silverstein, "Implementing Include-what-you-use Using Clang", llvm: include-what-you-use, Nov. 4, 2010.
"Instructions for Users—How to install and run include what you use", Include-What-You-Use, retrieved from <http://code.google.com/p/include-what-you-use/wiki/InstructionsForUsers>, updated May 17, 2011.
"What Is a Use—Summary of IWYU's rules for deciding what is an IWYU violation", Include-What-You-Use, retrieved from <http://code.google.com/p/include-what-you-use/wiki/WhatIsAUse>, print date Dec. 16, 2011.
"Why IWYU—Why Bother with Include-What-You-Use?", Include-What-You-Use, retrieved from <http://code.google.com/p/include-what-you-use/wiki/WhyIWYU>, print date Dec. 16, 2011.
"Why IWYU Is Difficult—Some of the challenges in an include what you use implementation", Include-What-You-Use, retrieved from <http://code.google.com/p/include-what-you-use/wiki/WhyIWYUIsDifficult>, print date Dec. 16, 2011.
"Static Include Analysis for Eclipse CDT", Includator, retrieved from <http://www.includator.com>, print date Dec. 16, 2011.

* cited by examiner

*Primary Examiner* — Chat Do
*Assistant Examiner* — Jae Jeon
(74) *Attorney, Agent, or Firm* — McDermott Will & Emery LLP

(57) ABSTRACT

A system and machine-implemented method modifying a source code file to reduce dependencies included therein. The source code file is parsed to identify a symbol within the source code file, and one or more header files are identified, each of which is capable of resolving the symbol for the source code file. A header file is selected from the one or more header files for inclusion in the source code file, based on a predetermined set of rules. The source code file is modified to include the selected header file.

18 Claims, 5 Drawing Sheets

MODIFYING A SOURCE CODE FILE TO REDUCE DEPENDENCIES INCLUDED THEREIN

BACKGROUND

The subject disclosure generally relates to modifying source code, and, in particular, to modifying a source code file to reduce dependencies included therein.

In computing, source code typically refers to text written in a computer programming language. Source code can be either compiled or interpreted to render it executable. Furthermore, source code can be organized into several source code files. For example, a header file may be included to resolve one or more symbols defined in a C file. As such, compiling the C file may also require the compilation of the header file. It should be noted that, in general, the time and memory requirements for compiling a source code grow as the number of source code files grows. As such, if unnecessary header files are included in source code files, extra burden can be placed on a system during the compilation/interpretation process. Thus, a manner for optimizing source code to reduce unnecessary dependencies therein may be desirable.

SUMMARY

The disclosed subject matter provides for modifying a source code file to reduce dependencies in the source code file. The source code file is parsed to identify a symbol within the source code file, and one or more header files are identified, each of which is capable of resolving the symbol for the source code file. A header file is selected from the one or more header files for inclusion in the source code file, based on a predetermined set of rules. The source code file is then modified to include the selected header file.

Thus, the disclosed subject matter relates to a machine-implemented method for modifying a source code file to reduce dependencies included therein. The method comprises parsing the source code file to identify a symbol within the source code file, and identifying one or more header files, each of which is capable of resolving the symbol for the source code file. The method further comprises selecting a header file from the one or more header files for inclusion in the source code file, based on a predetermined set of rules, and modifying the source code file to include the selected header file.

The disclosed subject matter also relates to a system for modifying a source code file to reduce dependencies included therein. The system comprises one or more processors, and a machine-readable medium comprising instructions stored therein, which when executed by the processors, cause the processors to perform operations. The operations comprise parsing the source code file to identify a symbol within the source code file, identifying one or more header files, each of which is capable of resolving the symbol for the source code file, and selecting a header file from the one or more header files for inclusion in the source code file, based on a predetermined set of rules. The source code file includes an associated header file which is associated with the source code file, and the predetermined set of rules directs selection of a header file which is already included in the associated header file. The predetermined set of rules directs selection of a header file which is already included in the source code file. The predetermined set of rules directs selection of a header file which is the only header file that resolves another symbol within the source code file. The operations further comprise modifying the source code file to include the selected header file, unless the selected header file is already included in the source code file.

The disclosed subject matter also relates to a machine-readable medium comprising instructions stored therein, which when executed by a machine, cause the machine to perform operations. The operations comprise parsing the source code file to identify a symbol within the source code file, and identifying one or more header files, each of which is capable of resolving the symbol for the source code file. The operations further comprise selecting a header file from the one or more header files for inclusion in the source code file, based on a predetermined set of rules, and modifying the source code file to include the selected header file, unless the selected header file is already included in the source code file. The parsing, identifying, selecting and modifying are performed for every symbol in the source code file. For a given symbol, if the header file is not included in an associated header file, is not included in the source code file, and is not the only header file that resolves another symbol within the source code file, the symbol is set aside within a set of symbols for separate selection of one or more header files. The separate selection of the one or more header files corresponds to a set cover calculation.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Figure 1:
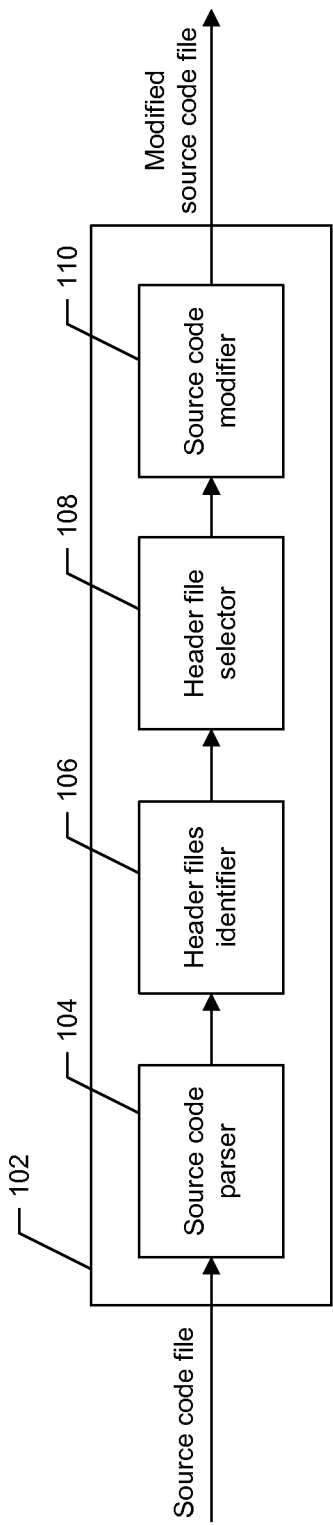
FIG. 1 is a block diagram illustrating example elements of a system for modifying a source code file to reduce dependencies included therein.

FIG. 1 is a block diagram illustrating example elements of a system for modifying a source code file to reduce dependencies included therein. System 102 includes a source code parser 104, a header files identifier 106, a header file selector 108 and a source code modifier 110.

A source code (e.g., for a software package or program) can be organized into several source code files. The source code files can be written in one or more programming languages including, but not limited to, C++, C, objective-C and C#.

As noted above, if unnecessary header files are included in a source code file, extra burden can be placed on a system during the compilation/interpretation process. Thus, the system illustrated in FIG. 1 can be used to modify a source code file to reduce dependencies included therein. The system reduces dependencies by selecting which header files are to be included in a source code file. The description of FIG. 1 herein relates to the modification of a source code file. However, it should be understood the system can be used to modify multiple source code files, such as all source code files included within a source code.

Source code parser 104 parses a source code file to identify a symbol within the source code file. A symbol can refer to the variables, functions, types and macros defined within a source code file. To parse the source code file, it may be necessary to use a compiler capable of evaluating all symbols in the source code file and how the symbols are used. Such a compiler can be specific to one or more programming languages of the source code. For a symbol identified by source code parser 104, it is typically necessary to include a corresponding header file which resolves the symbol in the source code file. For example, a header file in the form of a ".h" file should be included to resolve one or more symbols defined in a C file, which can be in the form of a ".cc" file for C++, a ".c" file for C, a ".c" file for objective-C and a ".cpp" file for C#. As such, header files identifier 106 identifies one or more header files, each of which can resolve the symbol for the source code file. In this regard, it is possible for any one of multiple header files to resolve an identified symbol. While any of these header files can be included to resolve the symbol, in order to reduce the number of dependencies in the source code, the system of FIG. 1 may select one of the multiple header files for inclusion in the source code file.

Thus, header file selector 108 selects a header file from the one or more header files for inclusion in the source code file. In doing so, header file selector may select the header file based on a predetermined set of rules. For example, the predetermined set of rules can direct selection of header files based on minimizing rewrite of the source code file, and on minimizing the total number of header files included in the source code file. Implementation details for the predetermined set of rules will be described in greater detail below, with reference to FIGS. 2 to 4.

Once a header file has been selected from the multiple candidates of header files, source code modifier 110 can modify the source code file to include the selected header file. For example, in the C++ programming language, a C file (in the form of a ".cc" file) can be rewritten to include a header file, by inserting "#include" in the C file, followed by the name of the header file (in the form of a ".h" file). Furthermore, source code modifier 110 can choose not to include unnecessary header files. For example, in the C++ language, source code modifier 110 can instruct not to insert a "#include" for a header file, or to remove a "#include" for a header file, from the source code file. As such, system 102 is capable of modifying a source code file to remove dependencies included therein. Furthermore, system 102 can apply such processing to all source code files in a source code, thereby modifying the entirety of the source code to reduce dependencies included therein.

The user of system 102 can be notified of the changes in the source code files. In this regard, modification of the source code files can happen automatically by system 102, such that the source code is modified without user intervention. It is also possible that modification of one or more of the source code files can occur based on user permission, where the user is notified of particular changes and the user decides whether or not the changes should be applied.

Figure 2:
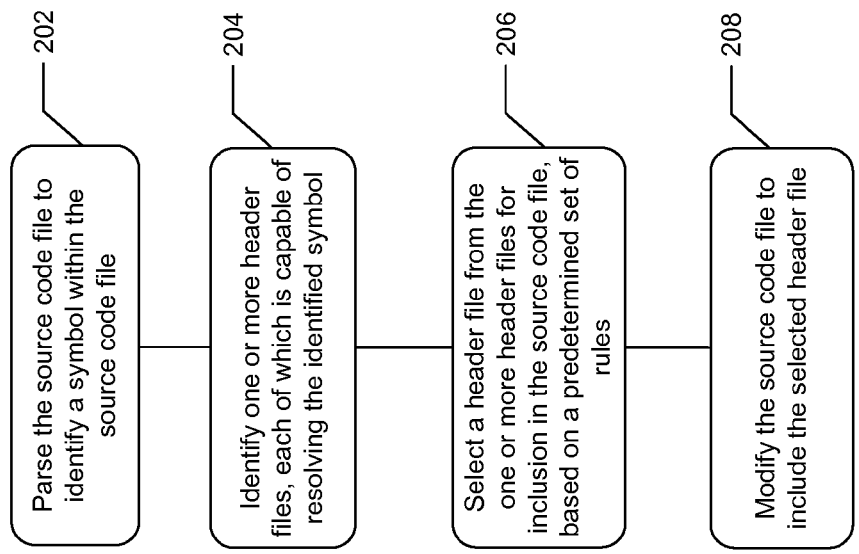
FIG. 2 illustrates a process by which a source code file is modified to reduce dependencies included therein.

FIG. 2 illustrates a process by which a source code file is modified to reduce dependencies included therein. At step 202, the source code file is parsed to identify a symbol within the source code file. The parsing can be performed by a compiler configured to identify symbols within the source code file. At step 204, one or more header files are identified, each of which is capable of resolving the symbol for the source code file. At step 206, a header file is selected from the one or more header files for inclusion in the source code file, based on a predetermined set of rules. For example, when the source code file includes an associated header file, the predetermined set of rules can direct selection of a header file already included in the associated header file. The predetermined set of rules can also direct selection of a header file which is already included in the source code file. In addition, the predetermined set of rules can direct selection of a header file which is the only header file that resolves another symbol within the source code file. For a given symbol, if the header file is not included in an associated header file, is not included in the source code file, and is not the only header file that resolves another symbol within the source code file, the symbol can be set aside within a set of symbols for separate selection of one or more header files. The separate selection of the one or more header files can correspond to a set cover calculation. At step 208, the source code file is modified to include the selected header file. It is possible that this modification is not performed if the selected header file is already included in the source code file.

Figure 3:
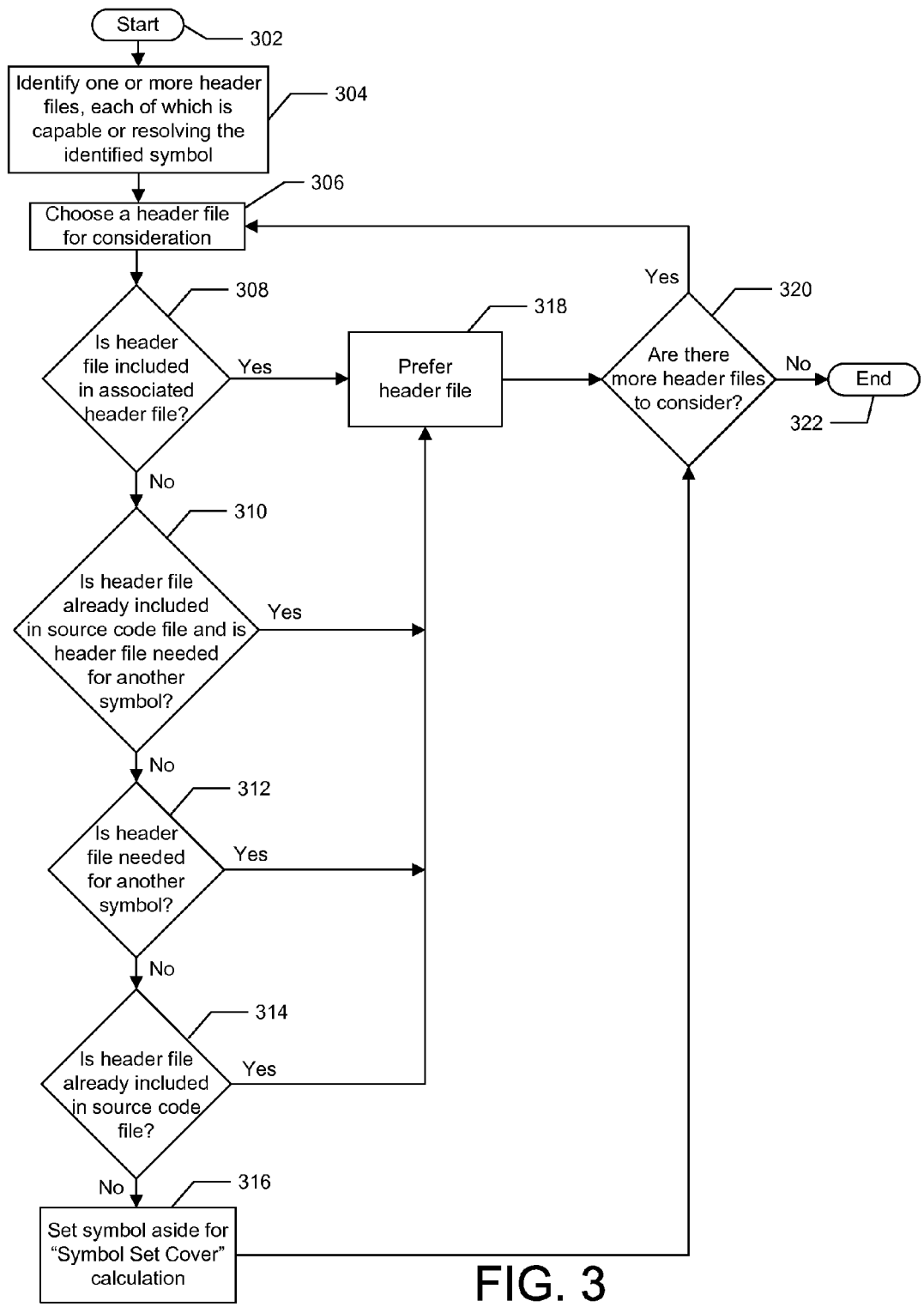
FIG. 3 illustrates a process by which a header file is selected from one or more header files for resolving an identified symbol within a source code file.

FIG. 3 illustrates a process by which a header file is selected from plural header file candidates for resolving an identified symbol within a source code file. The process of FIG. 3 can be applied to each symbol that is needed by the source code file, in order to select a header file for inclusion in the source code file. Furthermore, the process of FIG. 3 can be applied to each source code file within a source code. As described above, the source code file can be parsed using a compiler, to determine which symbols are needed in a source code file.

Following start block 302, one or more header files are identified, each of which is capable of resolving the symbol for the source code file, at step 304. From the plural header file candidates, one header file can be selected to resolve the identified symbol. For example, at step 306, a first header file is selected for consideration.

At decision step 308, an inquiry is made as to whether the header file candidate is included in an associated header file of the source code file. If the answer to this inquiry is yes, then the source code file inherits the inclusion and does not need to include the header file candidate. Thus, at step 318, that header file is preferred over the other header files for the identified symbol at step 318. Using C++ as an example, if the source code file "foo.cc" includes an associated header file "foo.h", and the header file candidate consideration (e.g., "bar.h") is already included in "foo.h", then "foo.c" inherits the inclusion and does not need to include "bar.h". Thus, the header file candidate "bar.h" is preferred over other header files. If the answer to the inquiry at decision step 308 is no, the process continues to decision step 310.

It should be noted that if it is later determined that the associated header file does not need to include the header file candidate, it is possible for other actions to be performed to resolve the identified symbol. For example, the header file candidate can be moved from the associated header file (e.g., the ".h" file) to the source code file (e.g., the ".cc", ".c" or ".cpp" file), or a different header file can be used to resolve the identified symbol.

At decision step 310, an inquiry is made as to whether the header file is included in the source code file, and is needed for another symbol. In particular, the inquiry of whether the header file is needed for another symbol can correspond to whether the header file is the only header file that resolves the other symbol. Furthermore, the inquiry can correspond to whether the header file was preferred at step 318 in a previous iteration of the main selection loop comprised of decision steps 308 to 314. If the answer to the inquiry at decision step 310 is yes, the header file is preferred over other header files in step 318. Otherwise, the process continues to decision step 312.

At decision step 312, an inquiry is made as to whether the header file is needed for another symbol. As noted above, this inquiry can correspond to whether the header file is the only header file that resolves the other symbol, or to whether the header file was preferred at step 318 in a previous iteration of the main selection loop comprised of decision steps 308 to 314. If the answer to the inquiry at decision step 312 is yes, the header file is preferred over other header files in step 318. In this case, it can be assumed (from decision steps 308 and 310) that the header file is not inherited from an associated header file or is not included in the source code file. Thus, the header file can be added to the source code file. On the other hand, if the answer to the inquiry at decision step 312 is no, the process continues to decision step 314.

At decision step 314, an inquiry is made as to whether the header file is already included in the source code file. If the answer to this inquiry is yes, the header file is preferred over other header files in step 318. Otherwise, the identified symbol is set aside within a set of symbols for separate selection of one or more header files. This separate selection can correspond to a set cover calculation. The set cover calculation selects a small number of header files which between them resolve all of the symbols within the set of symbols. The set cover calculation will be described in greater detail below, with reference to FIG. 4.

Following step 318, an inquiry is made as to whether there are more header files to consider at decision step 320. If the answer to this inquiry is yes, the process returns to step 306, where the next header file candidate is selected for consideration. Otherwise, the process ends at end block 322. Thus, the example of FIG. 3 illustrates that a header file can be selected from plural header file candidates for resolving an identified symbol within a source code file. For a given symbol, a header file can be selected if the header file is included in an associated header file, is already included in the source code file, or is the only header file that resolves another symbol within the source code file. Otherwise, the symbol can be set aside within a set of symbols for separate selection of one or more header files. This separate selection can correspond to a set cover calculation.

Figure 4:
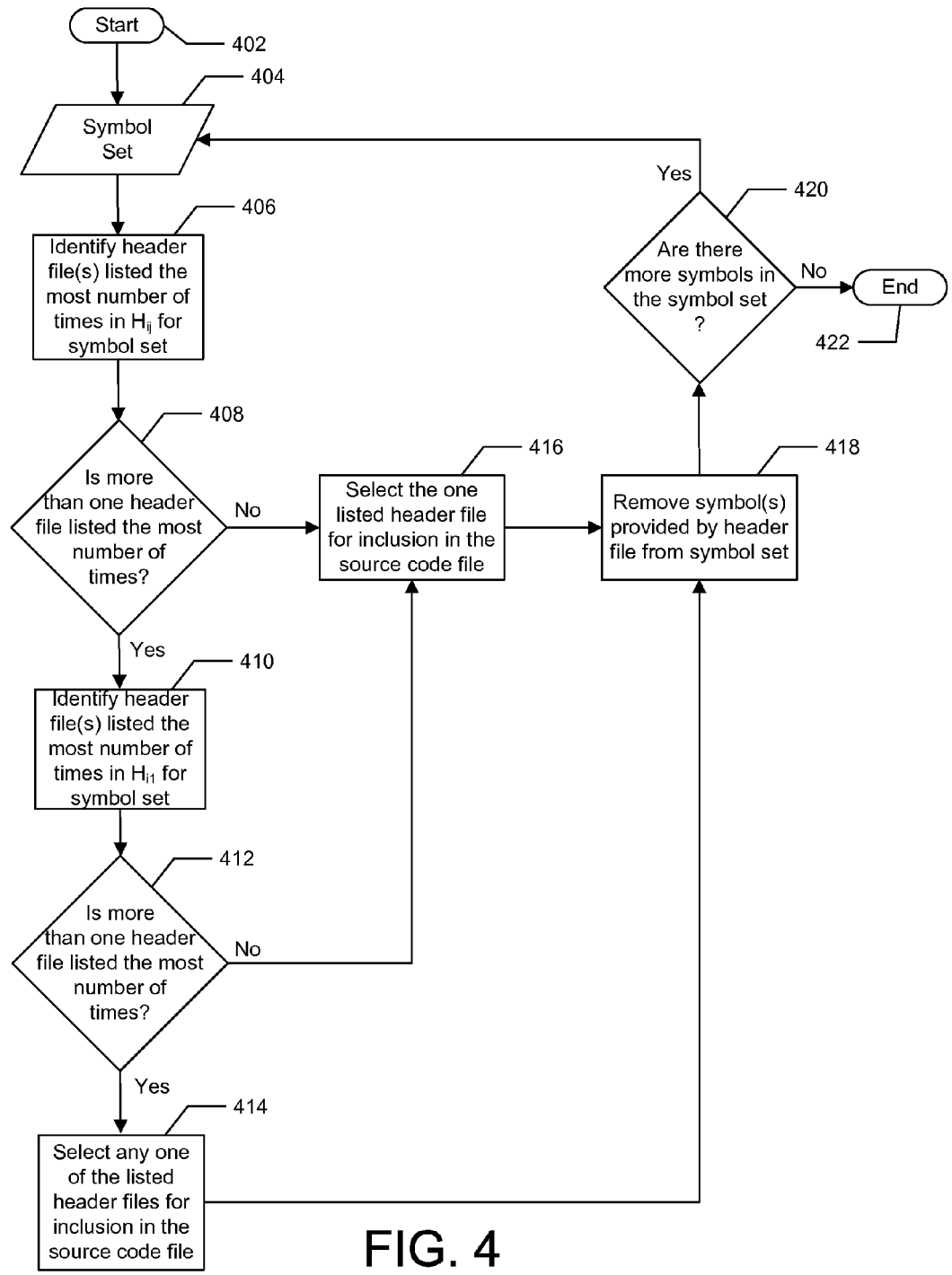
FIG. 4 illustrates a process by which header files are selected for the set of symbols remaining after the process of FIG. 3.

In this regard, FIG. 4 illustrates a process by which header files are selected for the set of symbols remaining after the process of FIG. 3. Given the set of symbols, a set cover calculation can be used to select a small number of header files which between them resolve all of the symbols within the set of symbols. In the example of FIG. 4, the set of symbols can be represented by $S_1, S_2, \ldots, S_n$. These symbols are all used by a source code file. Furthermore, the set of symbols all have multiple header files that can resolve them. The multiple header files can be represented by $H_{11}, H_{12}, \ldots, H_{1c\_1}, H_{21}, \ldots H_{2c\_2}, \ldots, \ldots H_{n1}, H_{n2}, \ldots H_{nc\_n}$. Following start block 402, a symbol set 404 can be provided as input to step 406. At step 406, the header file(s) listed the most times in $H_{ij}$ is identified. At this point, it is possible that only one header file is listed the most times in $H_{ij}$, or that multiple header files are listed the most times. At decision step 408, an inquiry is made as to whether there is more than one header file listed the most number of times in $H_{ij}$. If the answer to this inquiry is no, only one header file is listed the most times, and this header file is selected for inclusion in the source code file at step 416. Otherwise, the process continues to step 410.

At step 410, from among the multiple header files listed the most number of times in $H_{ij}$, an identification of the header file(s) listed the most times in $H_{i1}$ is made. Again, it is possible that only one header file is listed the most times in $H_{i1}$, or that multiple header files are listed the most times.

At decision step 412, an inquiry is made as to whether there is more than one header file listed the most number of times in $H_{i1}$. If the answer to this inquiry is no, only one header file is listed the most times, and this header file is selected for inclusion in the source code file at step 416. Otherwise, the process continues to step 414, at which any one of the header files listed the most times in $H_{i1}$ can be selected. In this regard, the selection of the one header file can be arbitrary (e.g., the first listed header file can be selected). At this point, a header file has been selected for inclusion in the source code file, and the selected header file resolves one or more symbols within the symbol set. At step 418, the symbol set is modified by removing all symbol(s) provided by the selected header file from the symbol set.

At decision step 420, an inquiry is made as to whether there are more symbols in the modified symbol set. If the answer to this inquiry is yes, the modified symbol set becomes the new input 404 to step 406. Otherwise, the process ends at end block 422. Thus, FIG. 4 illustrates a process by a set cover calculation can be used to select header files for inclusion in the source code file. In particular, the set cover calculation selects a small number of header files which between them resolve the set of symbols remaining after the process of FIG. 3.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 5:
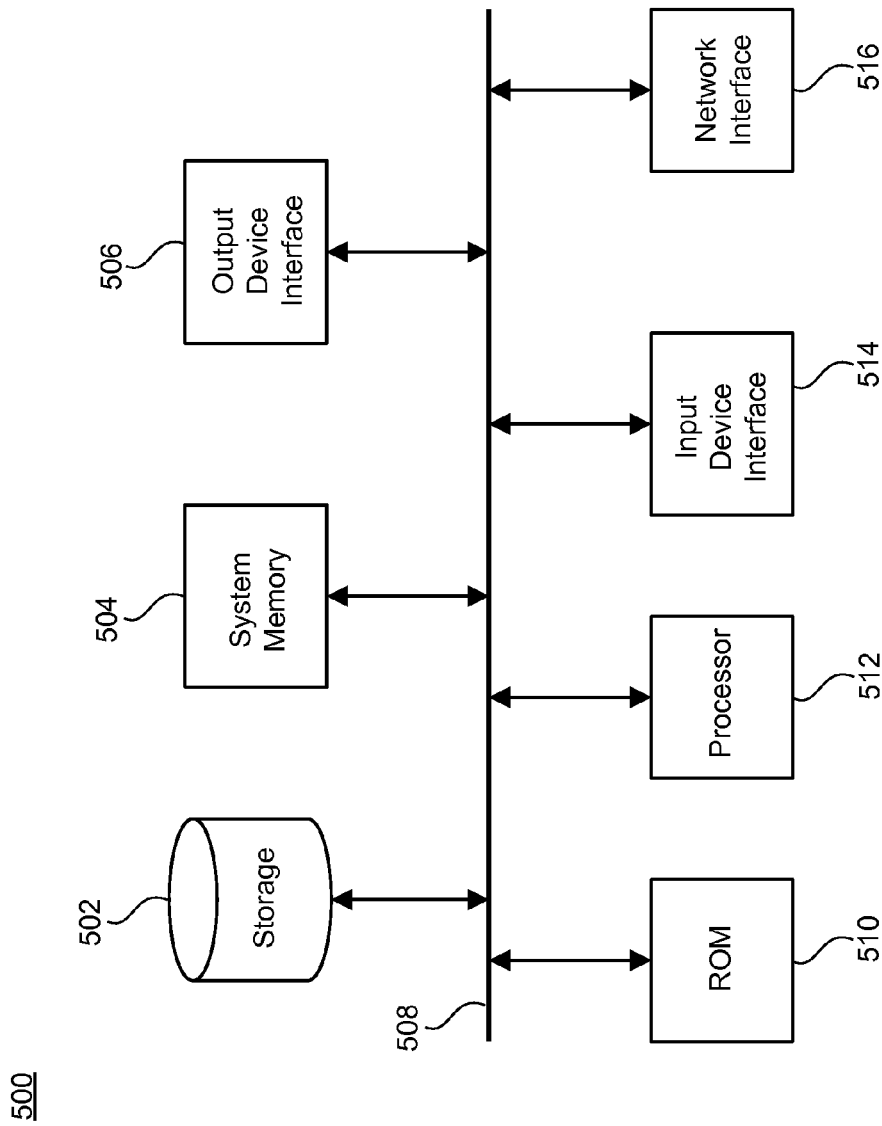
FIG. 5 conceptually illustrates an electronic system with which some implementations of the subject technology are implemented.

FIG. 5 conceptually illustrates an electronic system with which some implementations of the subject technology are implemented. Electronic system 500 can be a computer, phone, PDA, or any other sort of electronic device. Such an electronic system includes various types of computer readable media and interfaces for various other types of computer readable media. Electronic system 500 includes a bus 508, processing unit(s) 512, a system memory 504, a read-only memory (ROM) 510, a permanent storage device 502, an input device interface 514, an output device interface 506, and a network interface 516.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. Some implementations of the subject disclosure use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such a random access memory. System memory 504 stores some of the instructions and data that the processor needs at runtime. In some implementations, the processes of the subject disclosure are stored in system memory 504, permanent storage device 502, and/or ROM 510. For example, the various memory units include instructions for modifying source code in accordance with some implementations. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interfaces 506 enables, for example, the display of images generated by the electronic system 500. Output devices used with output device interface 506 include, for example, printers and display devices, such as cathode ray tubes (CRT) or liquid crystal displays (LCD). Some implementations include devices such as a touchscreen that functions as both input and output devices.

Finally, as shown in FIG. 5, bus 508 also couples electronic system 500 to a network (not shown) through a network interface 516. In this manner, the computer can be a part of a network of computers (such as a local area network ("LAN"), a wide area network ("WAN"), or an Intranet, or a network of networks, such as the Internet. Any or all components of electronic system 500 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback: and input from the user can be received in any form, including acoustic, speech, or tactile input. In addition, a computer can interact with a user by sending documents to and receiving documents from a device that is used by the user, for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for modifying a source code file to reduce dependencies included therein, the method comprising:
 parsing the source code file to identify plural symbols within the source code file, wherein each symbol of the identified plural symbols corresponds to at least one of a variable, function, type or macro within the source code file;
 for each of the identified plural symbols:
  identifying one or more header files based on the identified symbol, such that each of the one or more header files is capable of resolving the symbol for the source code file;
  selecting a single header file or no header file from the one or more header files for inclusion in the source code file, based on a predetermined set of rules which direct header file selection;

modifying, in a case where a single header file is selected, the source code file to include the selected header file; and adding, in a case where no header file is selected, the symbol to a set of symbols;

selecting one or more additional header files which resolve the set of symbols from a group of header files, $H_{ij}$, wherein $H_{ij}$ corresponds to a data structure with i by j header files, and wherein i and j are greater than 1, the selecting the one or more additional header files comprising:

identifying a header file which is listed the most times in $H_{ij}$ wherein the header file listed the most time in $H_{ij}$ resolves the most symbols within the set of symbols;

determining, in a case where more than one header file is listed the most times in $H_{ij}$, which of the header files from among those listed the most times in $H_{ij}$ is listed the most times in $H_{i1}$; and selecting the one or more additional header files based on the identification or the determination;

including the one or more additional header files in the source code file;

and modifying the source code to remove header files other than those header files selected for inclusion in the source code file.

2. The method of claim 1, wherein the parsing is performed by a compiler configured to identify symbols within the source code file.

3. The method of claim 1, wherein the parsing, identifying, selecting and modifying are performed for more than one source code file included in a source code.

4. The method of claim 1, wherein the source code file corresponds to a header file in any of the C++, C, objective-C and C# programming languages.

5. The method of claim 1, wherein the source code file corresponds to a C file in any of the C++, C, objective-C and C# programming languages.

6. The method of claim 1, wherein the source code file includes an associated header file which is associated with the source code file, and wherein the predetermined set of rules directs selection of a header file which is already included in the associated header file.

7. The method of claim 1, wherein the predetermined set of rules directs selection of a header file which is already included in the source code file.

8. The method of claim 1, wherein the modifying step comprises modifying the source code file to include the selected header file, unless the selected header file is already included in the source code file.

9. The method of claim 1, wherein the predetermined set of rules directs selection of a header file which is the only header file that resolves another symbol within the source code file.

10. The method of claim 1, wherein for a given symbol, if the header file is not included in an associated header file, is not included in the source code file, and is not the only header file that resolves another symbol within the source code file, the symbol is added to the set of symbols.

11. A system for modifying a source code file to reduce dependencies included therein, the system comprising:

one or more processors; and a machine-readable medium comprising instructions stored therein, which when executed by the processors, cause the processors to perform operations comprising:

parsing the source code file to identify plural symbols within the source code file, wherein each symbol of the identified plural symbols corresponds to at least one of a variable, function, type or macro within the source code file;

for each of the identified plural symbols:

identifying one or more header files based on the identified symbol, such that each of the one or more header files is capable of resolving the symbol for the source code file;

selecting a single header file or no header file from the one or more header files for inclusion in the source code file, based on a predetermined set of rules which direct header file selection;

modifying, in a case where a single header file is selected, the source code file to include the selected header file; and adding, in a case where no header file is selected, the symbol to a set of symbols, wherein the source code file includes an associated header file which is associated with the source code file, and the predetermined set of rules directs selection of a header file which is already included in the associated header file, wherein the predetermined set of rules directs selection of a header file which is already included in the source code file, and wherein the predetermined set of rules directs selection of a header file which is the only header file that resolves another symbol within the source code file;

selecting one or more additional header files which resolve the set of symbols from a group of header files, $H_{ij}$, wherein $H_{ij}$ corresponds to a data structure with i by j header files, and wherein i and j are greater than 1, the selecting the one or more additional header files comprising:

identifying a header file which is listed the most times in $H_{ij}$, wherein the header file listed the most time in $H_{ij}$ resolves the most symbols within the set of symbols;

determining, in a case where more than one header file is listed the most times in $H_{ij}$, which of the header files from among those listed the most times in $H_{ij}$ is listed the most times in $H_{i1}$; and selecting the one or more additional header files based on the identification or the determination;

including the one or more additional header files in the source code file;

and modifying the source code to remove header files other than those header files selected for inclusion in the source code file.

12. The system of claim 11, wherein the parsing is performed by a compiler configured to identify symbols within the source code file.

13. The system of claim 11, wherein the parsing, identifying, selecting and modifying are performed for more than one source code file included in a source code.

14. The system of claim 11, wherein the source code file corresponds to a header file in any of the C++, C, objective-C and C# programming languages.

15. The system of claim 11, wherein the source code file corresponds to a C file in any of the C++, C, objective-C and C# programming languages.

16. A machine-readable medium comprising instructions stored therein, which when executed by a machine, cause the machine to perform operations comprising:

parsing the source code file to identify plural symbols within the source code file, wherein each symbol of the identified plural symbols corresponds to at least one of a variable, function, type or macro within the source code file;

for each of the identified plural symbols:
- identifying one or more header files based on the identified symbol, such that each of the one or more header files is capable of resolving the symbol for the source code file;
- selecting a single header file or no header file from the one or more header files for inclusion in the source code file, based on a predetermined set of rules which direct header file selection; and
- modifying, in a case where a single header file is selected, the source code file to include the selected header file; and
- adding, in a case where no header file is selected, the symbol to a set of symbols;

selecting one or more additional header files which resolve the set of symbols from a group of header files, $H_{ij}$, wherein $H_{ij}$ corresponds to a data structure with i by j header files, and wherein i and j are greater than 1, the selecting the one or more additional header files comprising:
- identifying a header file which is listed the most times in $H_{ij}$, wherein the header file listed the most time in $H_{ij}$ resolves the most symbols within the set of symbols;
- determining, in a case where more than one header file is listed the most times in $H_{ij}$, which of the header files from among those listed the most times in $H_{ij}$ is listed the most times in $H_{i1}$; and
- selecting the one or more additional header files based on the identification or the determination;

including the one or more additional header files in the source code file;

and modifying the source code to remove header files other than those header files selected for inclusion in the source code file.

17. The machine-readable medium of claim 16, wherein the parsing is performed by a compiler configured to identify symbols within the source code file.

18. The machine-readable medium of claim 16, wherein the parsing, identifying, selecting and modifying are performed for more than one source code file included in a source code.

* * * * *